UNITED STATES PATENT OFFICE.

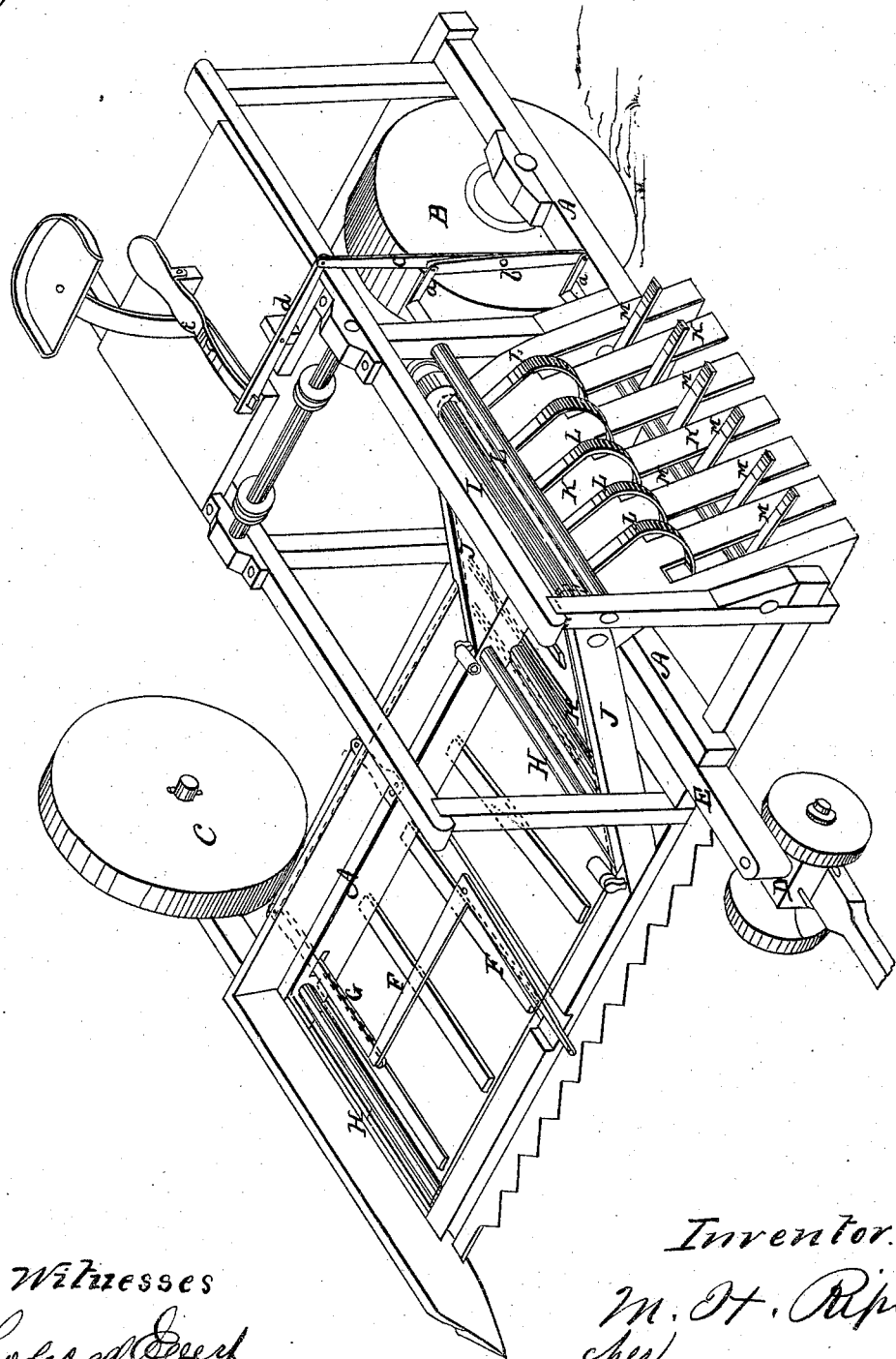

MOSES H. RIPLEY, OF MINNEAPOLIS, MINNESOTA.

IMPROVEMENT IN HARVESTERS.

Specification forming part of Letters Patent No. 98,635, dated January 4, 1870; antedated December 24, 1869.

*To all whom it may concern:*

Be it known that I, MOSES H. RIPLEY, of Minneapolis, in the county of Hennepin and in the State of Minnesota, have invented certain new and useful Improvements in Harvesters; and do hereby declare that the following is a full, clear, and exact description thereof, reference being had to the accompanying drawings, and to the letters of reference marked thereon.

The nature of my invention consists in the construction and general arrangement of a "harvester-dropper," which will drop its grain on one side, out of the way and in bundles.

In order to enable others skilled in the art to which my invention appertains, to make and use the same, I will now proceed to describe its construction and operation, referring to the annexed drawings, which form a part of this specification, and which represent a perspective view of my invention.

A represents the frame of a harvester, supported by the main driving-wheel B, which operates the sickle-bar, another wheel, C, situated in rear of the outer end of the sickle-bar, and a truck, D, attached to a tongue, E, at the front side of the machine, and near the inner end of the sickle-bar. To the truck D the team is attached in any suitable manner.

The sickle-bar in my machine is operated by a bent lever, F, pivoted at the angle to a cross-bar in the frame, one end of said lever being attached to the sickle-bar at or near its center, and the other end connected by a bar, G, to the lever situated at the rear of the frame, which lever obtains the required motion, through suitable gearing, from the main driving-wheel B.

In the frame A, in rear of the cutter-bar, are placed rollers H H, which have their bearings in the front and rear sides of the frame, and at the inner end of the frame two inclined bars, J J, are placed, at the top of which bars is another roller, I. Around the rollers H H and I an endless apron is placed, which carries the grain, as soon as cut, to the upper ends of the bars J J, when it falls down on the inclined board K, and is held up by the bent receivers L, until enough grain has been collected, when these receivers are, by means hereinafter to be described, raised, and the bundle of grain drops down on other receivers, M, and from thence on the ground, thus depositing the grain in bundles on one side of the machine. The endless apron is kept continually in motion by belts or cords, attached to pulleys on the ends of the rollers, and connected with the driving-wheel B.

The receivers L and M are operated by the following means: The heads of these rakes have their bearings in the frame A, and to one end of the same cranks $a$ $a$ are attached, which cranks are connected by a rod, $b$, pivoted to both of them. At the center of the rod or bar $b$, another bar, $c$, is pivoted, which, by a lever, $d$, is connected with a foot-lever, $e$, to be operated by the driver of the machine.

When the grain falls down in the receivers L, the receivers M are out of the way, the inclined board K being slotted, so that the teeth of the two receivers can pass through the same.

When the foot-lever $e$ is operated upon, the receivers L are raised, so as to allow the grain to drop down; at the same time the receivers M are raised, to receive the grain from the former.

The foot-lever $e$, being pressed back in its first position, causes the receivers L and M to return to their former place, the receivers M dropping the bundle on the ground, and the the receivers L to collect the next bundle.

The grain, it will be seen, is thus let down gradually onto the ground, in bundles, without being scattered all over the field.

Having thus fully described my invention, what I claim as new, and desire to secure by Letters Patent, is—

1. The arrangement of the bent lever F, bar G, and lever connecting said bar with suitable gearing on the driving-wheel B, when one arm of the lever F is connected with the sickle-bar, at or near its center, substantially as shown and described.

2. The combination of the rollers H and I, carrying an endless apron, with the inclined slotted board K and receivers L and M, all constructed and arranged to operate substantially as and for the purposes herein set forth.

3. The arrangement of the receivers L and M, cranks *a a*, connecting-bar *b*, bar *c*, lever *d*, and foot-lever *e*, all substantially as and for the purposes herein set forth.

In testimony that I claim the foregoing, I have hereunto set my hand, this 24th day of March, 1869.

MOSES H. RIPLEY.

Witnesses:
BUDD REEVE,
NATHAN B. SANDY.